United States Patent
Zappi et al.

(10) Patent No.: US 9,362,537 B2
(45) Date of Patent: Jun. 7, 2016

(54) ELECTROCHEMICAL CELLS, AND RELATED ENERGY STORAGE DEVICES

(71) Applicant: General Electric Company, Schenectady, NY (US)

(72) Inventors: Guillermo Daniel Zappi, Niskayuna, NY (US); Mohamed Rahmane, Ballston Lake, NY (US); Benjamin Hale Winkler, Albany, NY (US); James Lowe Sudworth, Bretby (GB); Roger Neil Bull, Repton (GB); Charles Dominic Iacovangelo, Saratoga Springs, NY (US)

(73) Assignee: General Electric Company, Niskayuna, NY (US)

(*) Notice: Subject to any disclaimer, the term of this patent is extended or adjusted under 35 U.S.C. 154(b) by 334 days.

(21) Appl. No.: 13/952,317

(22) Filed: Jul. 26, 2013

(65) Prior Publication Data

US 2013/0309544 A1 Nov. 21, 2013

Related U.S. Application Data

(63) Continuation-in-part of application No. 13/173,320, filed on Jun. 30, 2011, now abandoned.

(51) Int. Cl.
| | |
|---|---|
| *H01M 2/14* | (2006.01) |
| *H01M 2/18* | (2006.01) |
| *H01M 10/39* | (2006.01) |
| *H01M 10/617* | (2014.01) |

(Continued)

(52) U.S. Cl.
CPC *H01M 2/14* (2013.01); *H01M 2/18* (2013.01); *H01M 10/39* (2013.01); *H01M 10/3909* (2013.01); *H01M 10/617* (2015.04); *H01M 2/1646* (2013.01); *H01M 10/4235* (2013.01)

(58) Field of Classification Search
None
See application file for complete search history.

(56) References Cited

U.S. PATENT DOCUMENTS

| | | | |
|---|---|---|---|
| 4,992,345 A * | 2/1991 | Meintjes | H01M 4/66 29/623.1 |
| 5,532,078 A | 7/1996 | Redey et al. | |
| 5,573,871 A | 11/1996 | Von Benda | |

(Continued)

FOREIGN PATENT DOCUMENTS

| | | |
|---|---|---|
| GB | 2280779 A | 2/1995 |
| WO | 2008079563 A2 | 7/2008 |
| WO | 2008156927 A2 | 12/2008 |

OTHER PUBLICATIONS

Search Report and Written Opinion from corresponding EP Application No. 12173948.6-1227, dated Oct. 11, 2012, 7 pages.

*Primary Examiner* — Scott J Chmielecki
(74) *Attorney, Agent, or Firm* — Francis T. Coppa

(57) ABSTRACT

An electrochemical cell is presented. The cell includes a housing having an interior surface defining a volume, and an elongated, ion-conducting separator disposed in the volume. The separator usually extends in a vertical direction relative to a base of the housing, so as to define a height dimension of the cell. The separator has a first circumferential surface defining a portion of a first compartment. The cell further includes a shim structure disposed generally parallel to the first circumferential surface of the separator between the interior surface and the first circumferential surface of the separator. The structure includes at least two shims, a first shim and a second shim, that substantially overlap each other. An energy storage device including such an electrochemical cell is also provided.

20 Claims, 7 Drawing Sheets

(51) Int. Cl.
*H01M 2/16* (2006.01)
*H01M 10/42* (2006.01)

(56) References Cited

U.S. PATENT DOCUMENTS 5,763,117 A * 6/1998 Wright .............. H01M 10/3936
429/104

7,632,604 B2 * 12/2009 Iacovangelo .......... H01M 4/364
204/243.1
2008/0145755 A1 * 6/2008 Iacovangelo .......... H01M 4/364
429/188
2010/0178546 A1 * 7/2010 Rijssenbeek ........ H01M 2/0252
429/131
2010/0279154 A1 * 11/2010 Koetting ............. H01M 10/425
429/50

* cited by examiner

ELECTROCHEMICAL CELLS, AND RELATED ENERGY STORAGE DEVICES

CROSS REFERENCE TO RELATED APPLICATIONS

This application is a continuation-in-part of U.S. patent application No. 13/173,320, entitled "ELECTROCHEMICAL CELLS, AND RELATED DEVICES," filed on Jun. 30, 2011, which is herein incorporated by reference.

BACKGROUND

The invention relates generally to an electrochemical cell, and in some specific embodiments, to a high-temperature, rechargeable electrochemical cell, and related devices.

A battery is an essential component used to store a portion of the energy in mobile systems such as electric vehicles, hybrid electric vehicles and non-vehicles (for example locomotives, off-highway mining vehicles, marine applications, buses and automobiles), and for stationary applications such as uninterruptible power supply (UPS) systems and "Telecom" (telecommunication systems). The high-temperature sodium-metal halide electrochemical cells are generally targeted for use in locomotives; telecommunication, and uninterruptible power supply (UPS) batteries. These cells could potentially offer high energy density, high power density, longer cell life, and lower cost-requirements for many of these applications.

Normally, a battery is made up of many cells. Current development of these batteries is focused on performance and cell life. A number of factors can affect performance and limit the cell life. The primary factor may be unreliability of a separator. The most common separator used in these cells is beta"-alumina solid electrolyte (BASE), which is a sodium conducting ceramic. It should be noted that thermal cycling, pressure differential, sodium-wicking and vibrations in the cell during use, may damage the separator in some circumstances. The damaged separator may lead to a large thermal excursion which, in turn, causes corrosion of the cell casing (e.g. a steel casing). Usually, when the separator breaks, a metallic short is formed, allowing the battery to operate with the failed cell. In some cells, the cell casing corrodes. The corroded cell casing can allow the cell's chemical components to breach the casing, which can short out the entire battery.

Development work has been undertaken on different battery designs to avoid and/or solve the corrosion problem. One way to avoid the corrosion of the casing is by providing effective thermal and electrical conductance between the core of the cell and the casing. However, the currently available designs are not suitable to address these functions effectively.

It would therefore be desirable to develop a new cell design, with improved thermal and electrical management, for various battery applications.

BRIEF DESCRIPTION

Some embodiments of the present invention provide an electrochemical cell. The cell comprises a housing having an interior surface defining a volume. An elongated, ion-conducting separator is disposed in the volume, and has a first circumferential surface. A shim structure is disposed between the interior surface of the housing and the first circumferential surface of the separator, generally parallel to the first circumferential surface of the separator. The structure includes at least two shims, a first shim and a second shim, that substantially overlap each other.

In another embodiment, an electrochemical cell comprises a housing having an interior surface defining a volume, and having a base. The housing is polygonal in cross-section, and has a plurality of corner regions. An ion-conducting separator is disposed in the volume, and extends in a vertical direction relative to the base of the housing, so as to define a height dimension of the cell. The separator has a first circumferential surface defining a portion of a first compartment. The separator further has a plurality of lobe portions and valley portions. The plurality of lobe portions corresponds in number to the plurality of corner regions of the housing. The separator is concentrically located in the housing, with each lobe portion of the separator being aligned with and projecting towards one of the corner regions of the housing. The cell further includes a plurality of double-shim structures that correspond in number to the plurality of lobe portions. The plurality of double-shim structures are disposed between the interior surface of the housing and the first circumferential surface of the separator, and positioned generally parallel to the first circumferential surface of the separator.

An energy storage device is provided in some embodiments of the present invention. The device includes a plurality of electrochemical cells that are in thermal and electrical communication with each other.

DRAWINGS

These and other features, aspects, and advantages of the present invention will become better understood when the following detailed description is read with reference to the accompanying drawings, in which like characters represent like parts throughout the drawings, wherein.

DETAILED DESCRIPTION

Approximating language, as used herein throughout the specification and claims, may be applied to modify any quantitative representation that could permissibly vary, without resulting in a change in the basic function to which it is related. Accordingly, a value modified by a term or terms, such as "about", is not limited to the precise value specified. In some instances, the approximating language may correspond to the precision of an instrument for measuring the value.

In the following specification and claims, the singular forms "a", "an" and "the" include plural referents, unless the context clearly dictates otherwise.

As used herein, the terms "may" and "may be" indicate a possibility of an occurrence within a set of circumstances; a possession of a specified property, characteristic or function; and/or qualify another verb by expressing one or more of an ability, capability, or possibility associated with the qualified verb. Accordingly, usage of "may" and "may be" indicates that a modified term is apparently appropriate, capable, or suitable for an indicated capacity, function, or usage, while taking into account that in some circumstances the modified term may sometimes not be appropriate, capable, or suitable. For example, in some circumstances, an event or capacity can be expected, while in other circumstances, the event or capacity cannot occur. This distinction is captured by the terms "may" and "may be".

As used herein, the term "cathodic material" refers to a material that supplies electrons during charging, and is present as part of a redox reaction. The term "anodic material", as used herein, refers to a material that accepts electrons during charging, and is also present as part of the redox reaction.

As used herein, the term "high temperature" generally refers to a temperature above about 250 degrees Celsius (° C.), unless otherwise indicated.

Figure 1:
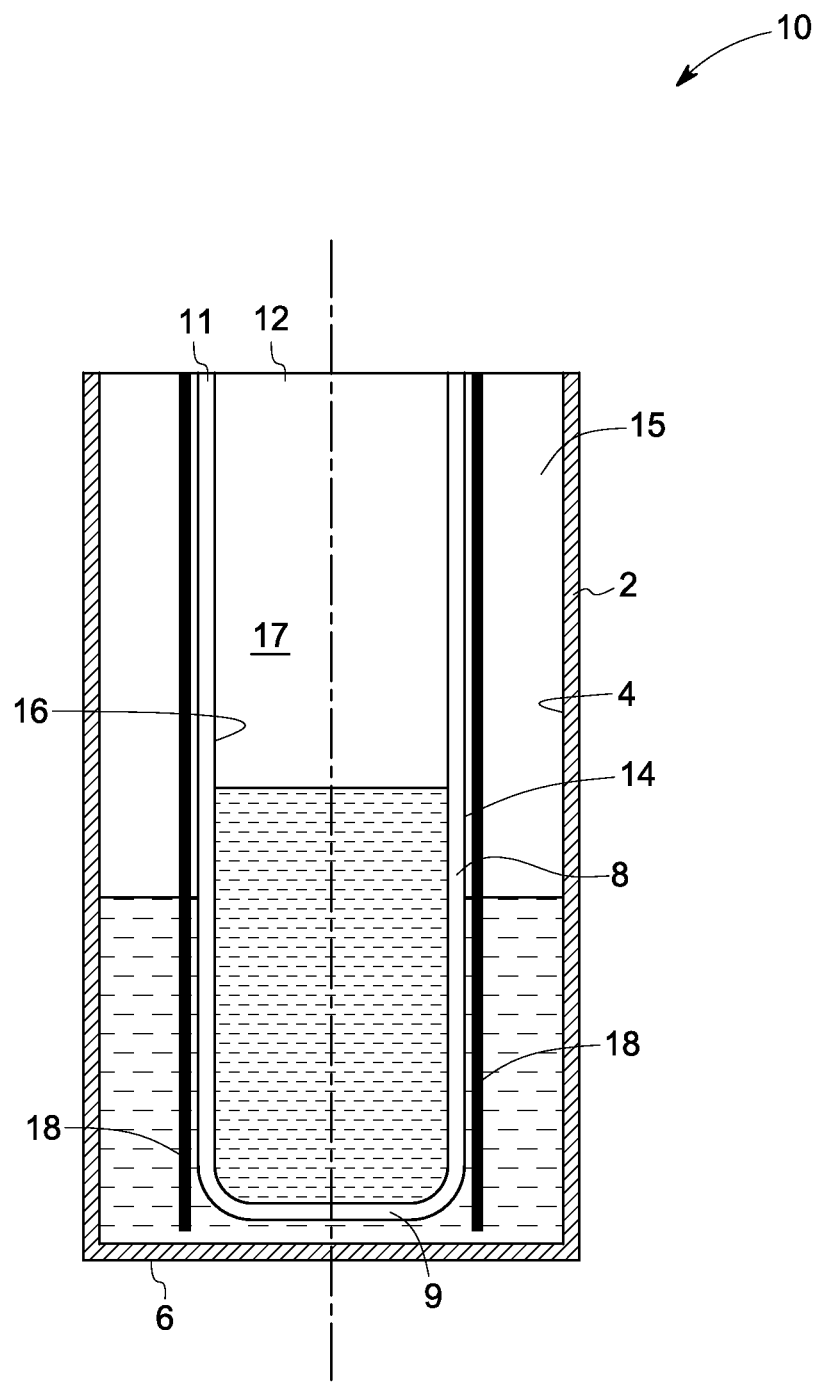
FIG. 1 is a schematic of an electrochemical cell according to an embodiment of the present invention.

FIG. 1 illustrates a schematic of an electrochemical cell 10, according to one aspect of the invention. The electrochemical cell 10 includes a housing 2 having an interior surface 4 that defines a volume; and has a base 6. In one embodiment, the housing 2 may have a circular or elliptical cross-section. In another embodiment, the housing 2 may be polygonal in cross-section, and may have a plurality of corner regions. In such instances, the housing 2 of the electrochemical cell 10 may be square in cross-section, and have four corner regions. With regard to the material, the housing 2 is generally made of a metallic material. Suitable metallic materials may include nickel, mild steel, stainless steel, nickel-coated steel, molybdenum and molybdenum-coated steel.

The electrochemical cell 10 includes an ion-conducting separator 8 disposed in the volume of the housing 2. The separator 8 is usually a sodium ion-conducting solid electrolyte. Suitable materials for the separator 8 may include beta'-alumina, beta"-alumina, beta'-gallate, beta"-gallate, or zeolite. In specific embodiments, the separator 6 includes a beta"-alumina solid electrolyte (BASE).

The separator 8 usually extends in a generally vertical direction relative to the base 6 of the housing 2, so as to define a height dimension of the cell 10. (The particular orientation of the separator, as well as the housing, can vary somewhat). The separator 8 may be cylindrical, elongate, tubular, or cup-shaped, with a closed end 9 and an open end 11. The open-end 11 of the separator may be sealable, and may be part of the separator assembly that defines an aperture 12 for filling the separator 8 with a material during the manufacture process. In one instance, the aperture 12 may be useful for adding the cathodic material. The closed-end 9 of the separator 8 may be pre-sealed, to increase the cell integrity and robustness.

With continued reference to FIG. 1, the separator 8 has a first circumferential surface 14 defining a portion of a first compartment 15 and a second circumferential surface 16 defining a portion of a second compartment 17. In one embodiment, the first compartment 15 includes sodium as an anodic material; and the second compartment 17 includes a cathodic material. The first compartment 15 is in ionic communication with the second compartment 17 through the sodium ion-conducting separator 8, e.g. a BASE separator.

Figure 2:
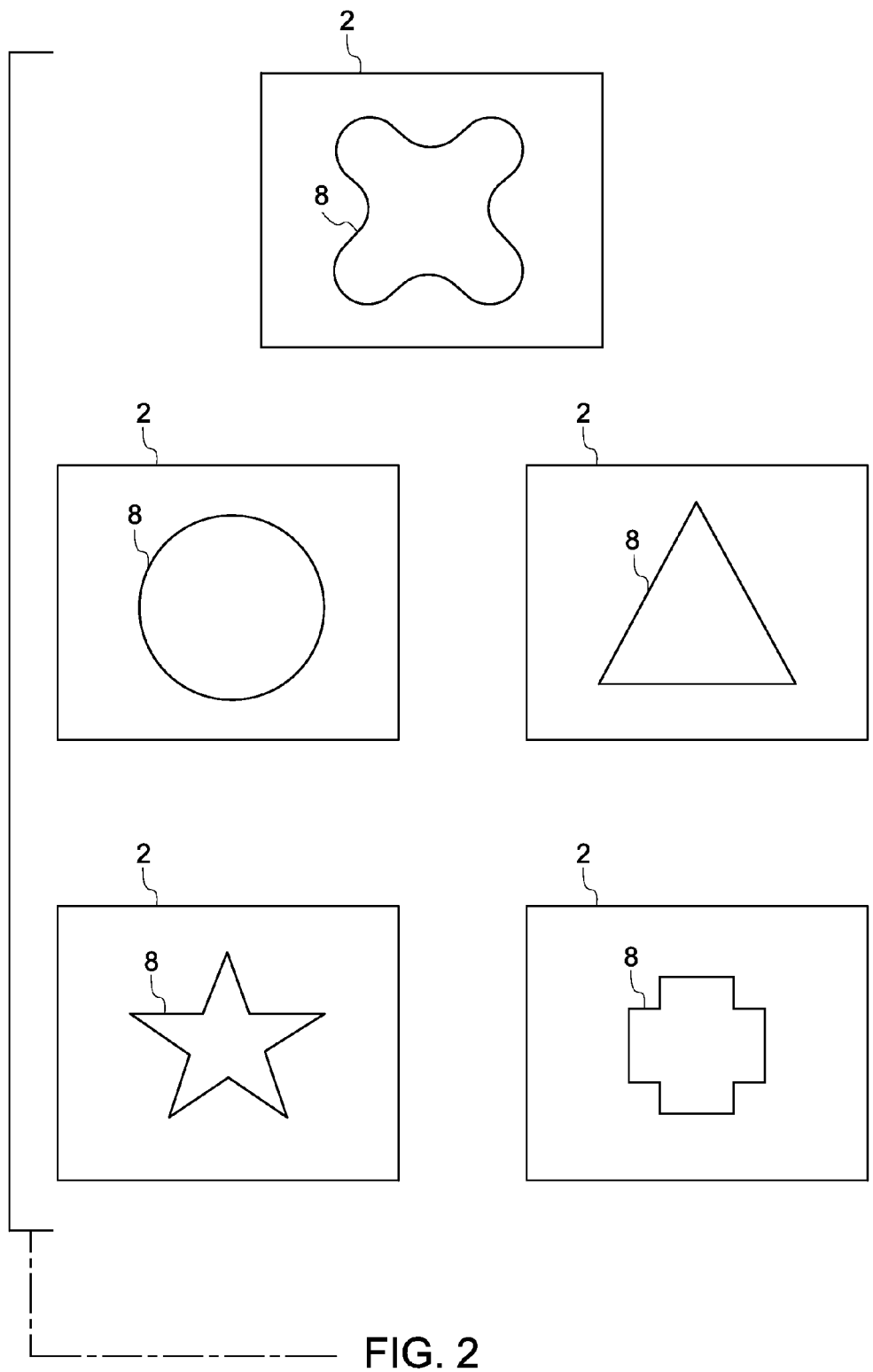
FIG. 2 is an array of separator designs for use in embodiments of the present invention.

The separator 8 may have a cross-sectional profile of a circle, an oval or ellipse, a polygon, a cross-shape, or a star-shape, for example. FIG. 2 illustrates some examples of the cross-sectional profiles of the separator 8 disposed in the housing 2.

According to most of the embodiments of the invention, the electrochemical cell 10 (FIG. 1) further includes at least one shim structure 18 disposed between the interior surface 4 and the first circumferential surface 14 of the separator 8, usually adjacent to the first circumferential surface 14. The shim structure may extend to the full height of the separator, although this is not always necessary. In one embodiment, the shim structure may extend to at least about 20 percent of the height of the separator. In an exemplary embodiment, the shim structure may extend to at least about 90 percent of the height of the separator. In FIG. 1, the shim structure is depicted simplistically, e.g., without reference to some of the shape variations described herein.

The shim structure may be mounted in close proximity to the first circumferential surface 14 of the separator 8. The shim structure usually has a shape that allows it to be wrapped around the BASE separator, so as to conform to all or a part of the first circumferential surface of the separator. In one embodiment, the shim structure is shaped so that one or more of its portions (as described below) are in physical contact with the first circumferential surface of the separator. Additionally, the shim structure can be positioned to hold and support the separator in a desired position. For example, the shim structure can be "biased" tightly against the maximum surface area of the BASE separator. Furthermore, the shim structure is designed in a manner that renders the shim portions flexible enough to allow the deposition and wicking of the anodic material, e.g., the sodium between the shim structure and the first circumferential surface 14 of the separator.

In one embodiment, multiple shim structures (i.e., each with at least a first shim and a second shim, as discussed below) may be combined to cover most of the surface area of the BASE separator from which an ionic current may be collected. If there is more than one shim structure, the structures may be interlocking or partially overlapping. Moreover, each shim structure may be physically connected to at least one other shim structure, or may constitute a portion of the housing. Moreover, other connections or contacts may be made between each shim structure and the housing, using other structures or pieces which may or may not be of the same material or shape. While a multitude of shim structures could be used, e.g., upwards of 10-12 structures, the use of as few shim structures as possible is sometimes desirable (depending on their shape and/or size), because of increased simplicity and lower cost. (The double shim design for embodiments of this invention is sometimes referred to simply as the "shim structure", although strictly speaking, that term also refers to the number of multiple shim structures that circumferentially surround the separator).

An edge of the shim structure can be worked, manufactured and/or formed to facilitate loading of the structure into the cell. The working may include flanging or beveling the edge of the shim structure, for example. A surface of the shim structure can further be worked or modified (e.g., crenellated) to define flowpaths, and to facilitate flow of the anodic material (usually sodium) over the first circumferential surface of the BASE separator, during the cell usage.

The shim structure of the present invention includes at least a first shim and a second shim (the individual shims are not shown in FIG. 1). As used herein, the term "shim" refers to a relatively thin, often tapered piece of a material, used to fill gaps, make something level, provide support to something, or adjust something to fit properly. A suitable shim for embodiments of this invention may be formed by bending, forming or extruding a metal sheet, or a metal foil of appropriate thickness and length.

Each shim of the shim structure may have opposing first and second surfaces. A portion of the first surface of the first shim may be generally parallel to the first circumferential surface of the separator. A portion of the second surface of the first shim may be generally parallel to a portion of the first surface of the second shim. In other words, the first shim and the second shim substantially overlap each other. In some embodiments, the overlap is greater than about 50 percent of the surface area of the first and second shims. In some embodiments, the overlap is greater than about 75 percent, and in some specific embodiments, greater than about 90 percent of the surface area of the first and the second shims. In some embodiments, the shims may be substantially identical in shape and size. In some other embodiments, shims of different sizes may be used. In certain embodiments, the shims may be symmetrical i.e. identical in shape and size; and may fully overlap one another.

A specific embodiment includes at least one "double-shim structure" disposed adjacent to the first circumferential surface of the separator. As used herein, the term "double-shim structure" refers to a set of two symmetrical shims fully overlapping each other, or at least having greater than about 50 percent overlap.

The shim structure may be constructed by placing a circumferential surface of one shim parallel to a circumferential surface of the other. For example, the shims may be disposed one over the other, pressed together, or simply placed in contact, e.g., touching one another, face-to-face. In some instances, the structure may be constructed by sliding one shim over another shim. In one embodiment, there is substantially no gap between two shims.

In another embodiment, there may be a gap between the shims, and the anodic material (e.g., sodium) may wick through the gap. The gap may be less than about 100 microns. In some instances, the gap is relatively small, and the amount of sodium moving through the gap would be insignificant. However, in other instances, the gap may be sufficient in size to accommodate an amount of the molten anodic material. The anodic material can substantially fill the gap between the shims, e.g., by capillary action. This can improve the electrical and thermal conductivity of the shim structure.

However, in some instances, it may be desirable to control or limit the amount of the anodic material entrapped within the gap between the shims, since that material would not be available for the cell operation. To reduce the entrapment, in some cases, the outer shim may have a plurality of pores to release the anodic material. In some cases, the outer surface of the second shim may be sodium-phobic to provide more sodium near the first shim The thickness of each shim can vary, but is usually in a range from about 0.01 millimeter to about 1 millimeter. In some embodiments, the thickness may range from about 0.05 millimeter to about 0.5 millimeter, and in some specific embodiments, from about 0.1 millimeter to about 0.2 millimeter.

The material used for the shims is usually thermally, and/or electrically conductive. Some of the preferred materials are chemically and electrochemically inert in the anode environment. In some embodiments, the material may include a single metal, or may be a metal-containing composite or alloy. In one embodiment, the shims may include a metal substrate covered with a different metal layer on one or both sides. In one embodiment, the shims may comprise iron, nickel, copper, aluminum, or any alloy containing the foregoing. Furthermore, each shim of the shim structure may be formed of a same material or of a different material.

In one embodiment, the first shim that is adjacent to the separator includes a sodium-philic material to enhance sodium wetting properties (with sodium again being used to represent any suitable anodic material). The sodium-philic material can be in the form of a layer or coating (e.g., on its first surface/separator-facing surface) that is capable of inducing the surface to "wick", i.e., by allowing a significant amount of sodium to wick between the shim structure and the separator surface. The wicking action can desirably enhance sodium conduction through the separator. Examples of wicking-coating materials are known in the art. In other cases, a treatment technique can be used to make the surface sodium-philic, e.g., using chemical etching, physical etching, or reactive gas exposure. U.S. Patent Application Publication No. 2010/0178546 A1, filed on 9 Jan. 2009, describes some of these techniques, and is incorporated herein by reference. Suitable examples of the sodium-philic material may include nickel, iron, steel, tungsten, and zinc, treated as described above.

In these various embodiments, the second shim can be formed of a material that exhibits high electrical conductivity. Copper is one example of such a material. (A copper-plated structure may also be possible). The second shim can considerably enhance electrical conductivity between a core region of the cell and the casing. Thus, some of the possible combinations of shims in a double-shim structure include (tube side/cell case side): nickel/copper, iron/copper, steel/copper, tungsten/copper; and zinc/copper. It should also be noted that in some embodiments in which the shims are in close contact with each other, their facing surfaces should be relatively smooth. Moreover, the surface of a shim that faces the separator surface can be patterned to provide increased surface area, as also described in the referenced Publication No. U.S. 2010/0178546 A1.

It may also be beneficial to provide surface treatments to the first shim and the second shim to further enhance anodic material transport, and electrical and thermal conductivity. For example, the first shim may have striations on the inner surface near the separator. These striations are usually longitudinal, from the bottom of the separator tube towards the top of the tube, and may comprise channels of triangular, circular, or polygonal cross section. This surface modification may help in providing uniform flow of the anodic material by creating more uniform use of the separator. In some instances (though not all), the outer surface of the first shim and/or both surfaces of the second shim may be treated to provide increased surface roughness, which may, in turn, result in enhanced heat transfer by providing a greater degree of surface contact.

The shim design for this invention usually (though not always) performs four primary functions. One function is to provide an intimate and uniform electrical contact between the separator and the anode and/or the housing, to facilitate charge transfer in the initial stages of the cell charging, when no sodium is present in the anode compartment. This may be achieved by shaping the shims forming the shim structure, so as to closely conform to the first circumferential surface of the separator. A second function is to provide thermal management for the cell, by transferring heat from the core region that generally produces heat during operation of the cell or battery (i.e., the cathode compartment of the cell in the illustrated configurations), to a location outside of the cell. The shim structuring having the first shim and the second shim substantially overlapping each other is capable of dissipating excess heat away from the core of the cell. Moreover, the shims can help to dissipate excess heat after cell failure, to minimize damage to the rest of the device.

The third function of the shim structure is to serve as a structural support for the separator. The shim structure provides dimensional stability by restricting the potential movement of the separator within the housing, and/or by absorbing vibrations and shocks. A fourth function is to provide an optimized distribution of metallic anodic material (e.g., sodium) over the regions of the separator through which ionic current would be passed. This may be achieved by the wicking of the anodic material by capillary forces between the shim structure and the separator.

As described above, the shim structure usually provides electrical and thermal conduction for the operation of the cell. Conventionally, a single, thin shim (e.g. a metal sheet or foil) can be used for that purpose. However, the single, thin shim may not provide sufficient and effective electrical as well as thermal conduction. On the other hand, a thick metal sheet or foil may be used to enhance electrical and thermal conduction. However, the increased thickness of such a shim may lead to less flexibility, making it difficult to bend into a particular shape, and to assemble inside the cell. In contrast, a set of multiple, relatively thin shims, overlapping one another according to embodiments of this invention (especially a double-shim structure), advantageously provides even higher electrical and thermal conduction without a significant lose in flexibility. It appears that some of the enhanced characteristics are due to the higher surface area provided by multiple shims.

Moreover, the multiple shim structure can be very advantageous in preventing excess heating within the cell compartment, which could otherwise damage the cell. The present inventors discovered that excess ohmic heating (sometimes referred to as resistive heating, joule heating, or "$I^2R$ heating") may sometimes occur in certain types of electrochemical cells. Some comparative testing of certain types of cells having a single shim configuration and those having a double-shim configuration clearly demonstrated greater durability for the double-shim cells. (The details of the single shim configuration cells and the double shim configuration cells are described in the example section below).

Figure 9:
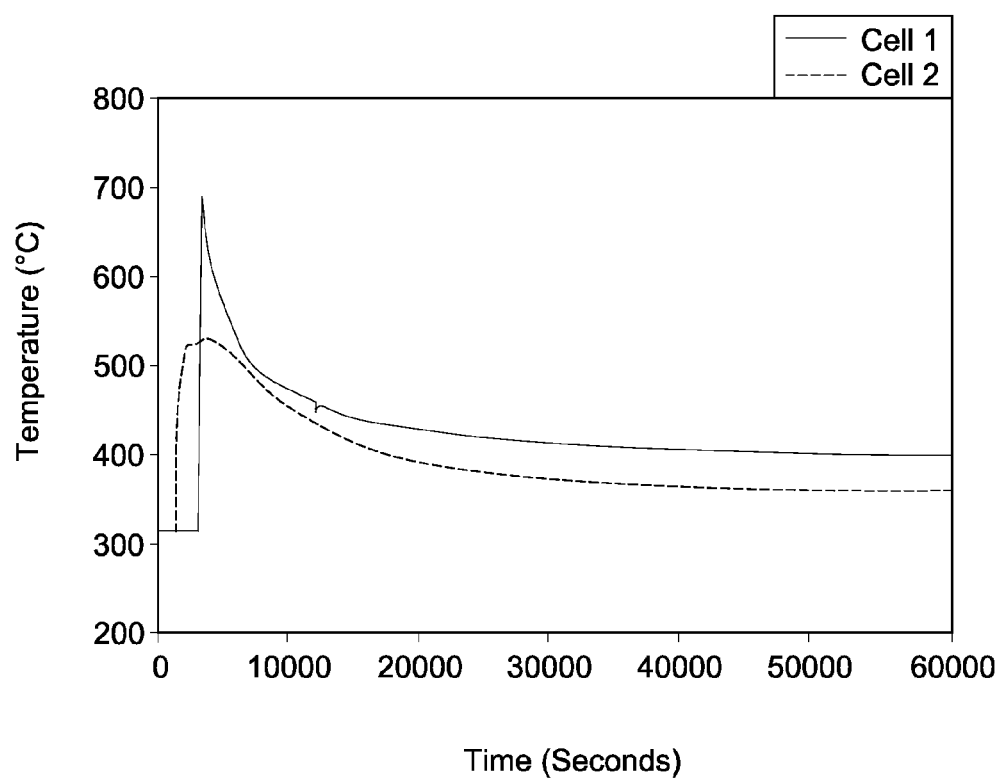
FIG. 9 is a graph showing comparative, temperature profiles of electrochemical cells, according to an exemplary embodiment of the invention.

As mentioned previously, the extra shim of the double shim structure can prevent excess ohmic heating, by either enhancing electrical conductivity, or enhancing thermal conductivity (increased heat dissipation), or a combination of the two phenomena. FIG. 9, further discussed below, shows temperature profiles for a single shim configuration cell (cell 1) and a double-shim configuration cell (cell 2). It is clear from the graph that the temperature profile of cell 2 is lower than that of cell 1, showing reduced heating of cell 2, as compared to cell 1. By reducing/preventing heating in a cell, the chance of damage to the cell may be significantly decreased.

As discussed above, the separator can be in a variety of shapes, e.g., circular, oval or ellipsoidal, or polygonal cross-sectional profile. In some particular embodiments, the separator may have a cross-sectional profile in the shape of a rugate. Such a shape usually includes a plurality of lobe portions and valley (depression) portions (also referred to as "lobes" and "valleys"), in an alternate fashion, as shown in the multi-lobed depiction of FIG. 2, and explained in some of the embodiments presented below. The rugate, which may provide a cloverleaf shape, may increase the overall available surface area of the separator for a given volume. In some embodiments, the number of lobes of the separator corresponds to the number of spaced, corner regions of the housing.

Figure 3:
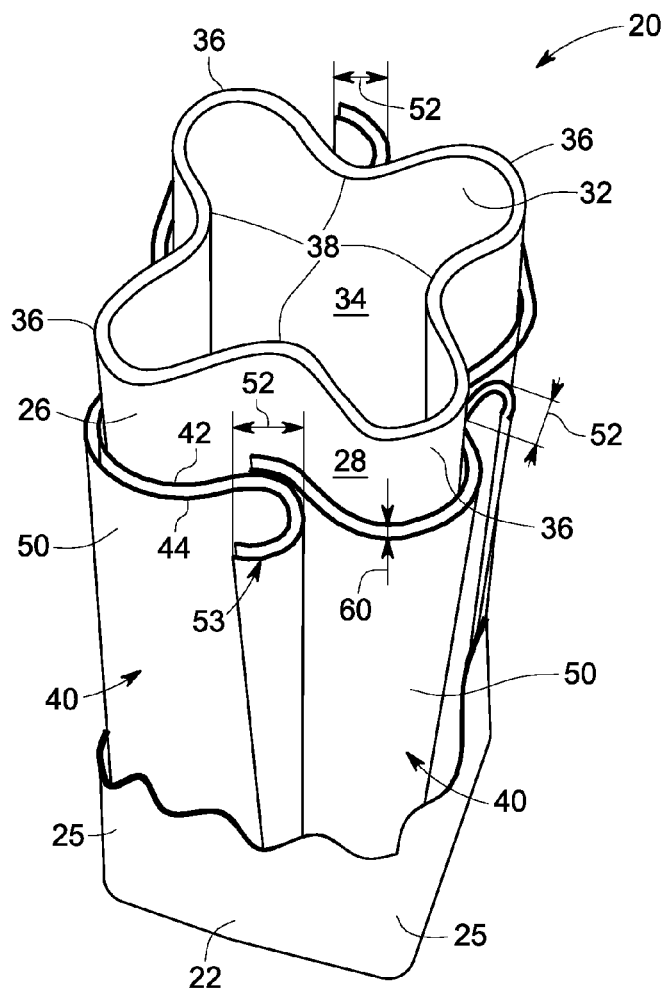
FIG. 3 is a schematic view illustrating a three dimensional view of an electrochemical cell, according to an embodiment of the invention.
Figure 4:
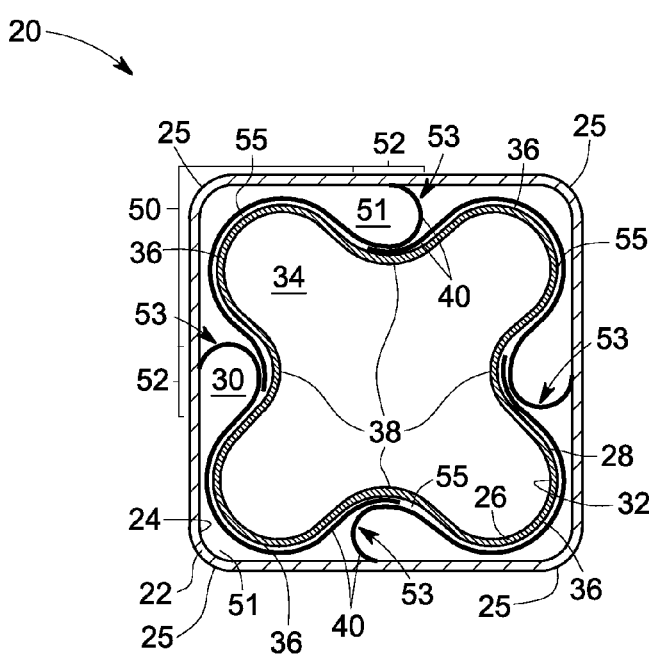
FIG. 4 is a cross-sectional, top view of an electrochemical cell, according to an embodiment of the invention.

FIGS. 3 and 4 illustrate a portion of an electrochemical cell 20 in accordance with an exemplary embodiment of the invention. The electrochemical cell 20 includes a housing 22 having an interior surface 24, defining a volume. For the purpose of illustration, the housing is only partially shown, in terms of its height. The housing can extend up to the full height of the separator, and usually does so. In the illustrated embodiment, the housing 22 has four corner regions 25. The separator 26 is disposed within the volume of the housing 22. The separator 26 may have a first circumferential surface 28 that defines a portion of a first compartment 30 (see FIG. 4 as well). The separator may further include a second circumferential surface 32 that defines a second compartment 34. The second compartment 34 is usually disposed within the first compartment 30. In this exemplary design, the first compartment 30 is an anode compartment and usually includes sodium, although other anodic materials are possible. The second compartment 34 is a cathode compartment and includes a cathodic material. The first compartment 30 is in ionic communication with the second compartment 34, through the separator 26.

As alluded to previously, the separator 26 can be designed to have four lobe portions (lobes) 36, and four corresponding valley portions 38 (FIGS. 3, 4). A pair of lobes may define the valley portion that spans a gap between an interior surface 24 of the housing 22, and a first surface 28 of the separator 26. The separator may be concentrically located in the housing 22, with each lobe 36 of the separator 26 being aligned with, and projecting towards, one of the corner regions 25 of the housing 22.

FIG. 3 further illustrates four shim structures 40 disposed adjacent the first circumferential surface 28 of the separator. Each shim structure 40 may engage one lobe portion 36, and at least a part of the valley portion 38 of the separator 26. The arrangement of the shim structures 40 around the separator 26, may be shown more clearly from a cross sectional profile of the electrochemical cell 20 (corresponding to FIG. 3), displayed in FIG. 4. In this embodiment, each shim structure 40 (shown as a single line for simplicity) includes the double-shim arrangement or double shim structure. A double-shim arrangement refers to a shim structure having two shims, e.g., usually two separate shims, as mentioned above and further described below. Each shim has opposing first and second surfaces, generally parallel to the other shim. The shape and profile of the shims are such that they usually fit the general shape and contour of the separator 26, providing an appropriate distance between the shim structure 40 and the separator 26 for wicking of the anodic material.

Figure 5A:
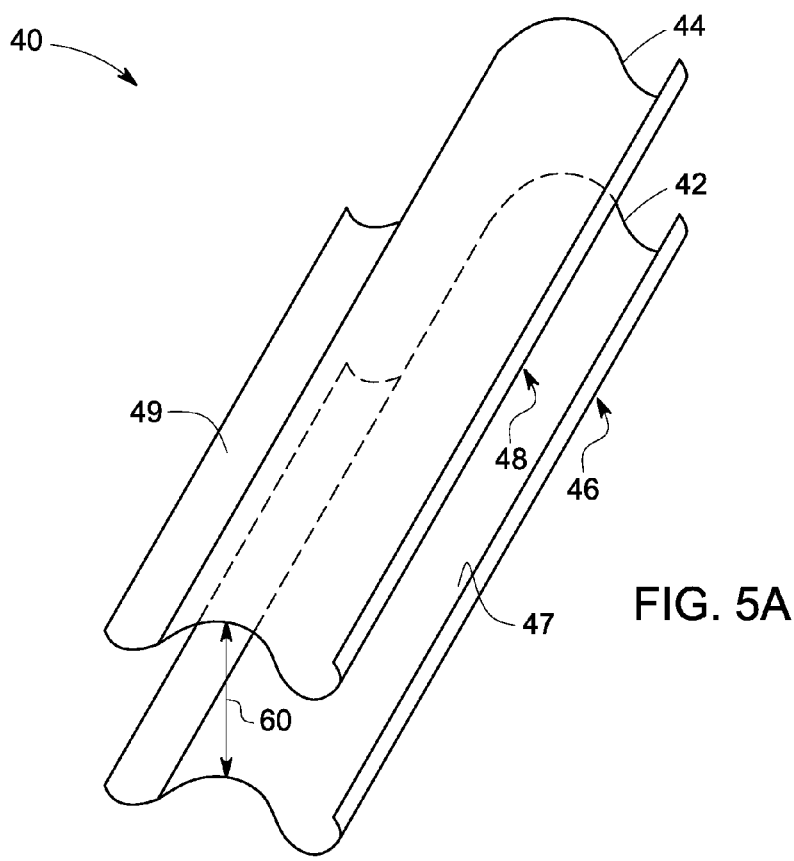
FIG. 5A is an expanded, perspective view of a shim structure, according to an embodiment of the invention.

FIG. 5A provides a non-limiting illustration of the double-shim structure 40, including a first shim 42 and a second shim 44. In this embodiment, the first shim and the second shim are symmetrical, and identical in shape and size. However they do not have to be identical to each other, in other embodiments.

Figure 5B:
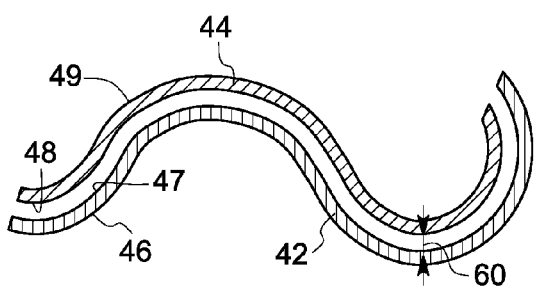
FIG. 5B is an expanded view of a cross-sectional profile of a shim structure, according to an embodiment of the invention.

FIG. 5B shows a corresponding, cross-sectional profile of the shim structure 40 of FIG. 5A. The first shim 42 has an inner circumferential surface (also referred to as "a first surface") 46 and an outer circumferential surface (also referred to as "a second surface") 47. The inner circumferential surface 46 is generally mounted in close proximity to the first circumferential surface 28 of the separator 26 (referring to FIG. 3). The second shim 44 has an inner circumferential surface 48 and an outer circumferential surface 49. The inner circumferential surface 48 of the second shim 44 is disposed generally parallel to the outer circumferential surface 47 of the first shim 42, such that, in this example, they fully overlap each other.

In one embodiment, there is substantially no gap between the two shims. In another embodiment, the two shims 42 and 44 may have a gap 60. The gap 60 may be kept as small as possible, although for clarity it is shown, exaggerated, in FIGS. 5A and 5B.

With continued reference to FIGS. 3 and 4, the first compartment 30 and the second compartment 34 usually include current collectors (not shown), to collect the current produced by the electrochemical cell 20. In some specific embodiments, the shim structure 40 collects the current in the first compartment, functioning as a current collector.

Referring to FIG. 3 and FIG. 4 again, each shim structure 40 often has a first section 50 and a second section 52, which may engage a portion of the first circumferential surface 28 of the separator 26. A right-angled bracket is used in FIG. 4 to show the sections 50 and 52. The first section 50 usually protrudes from the second section 52, and extends around and engages at least a lobe portion 36 of the separator 26. The second sections 52 of the shim structures 40 are disposed between a pair of lobe portions 36, i.e. valley portions 38 of the separator 26. As shown in FIG. 3, the second section 52 of each shim structure may "curl" away and outward from first section 50. A portion of the first section 50 of one shim structure is overlapped by a portion of the second section 52 of an adjacent shim structure. The first sections 50 of the structures 40 are in wicking contact with the surface 28 of the separator 26; as shown in FIG. 3 and FIG. 4.

Furthermore, the second section 52 usually includes a coil portion 53 that is situated in the valley portion 38 and configured to span a gap 51 between the interior surface 24 (FIG. 4) of the housing 22, and the first circumferential surface 28 of the separator 26, and thus may also be referred to as a "span section". The coil portions 53 may function to hold the shim structure 40 in place tightly, by pressing or biasing it against the first surface 28 of the separator. The pressure is due to compression of the coil 53 between the housing 22 and the separator 26, which provides a spring-like feature. In some embodiments, the coil may be formed of a material that allows the coil-induced pressure to have a pre-selected amount of force. Furthermore, the edges of the shims may be clamped under the coil portions of the shims.

The selected amount of force generated by the coil-induced pressure is usually configured to achieve a selected distance (gap) 55 between the shim structure 40 and the first circumferential surface 28 of the separator, as shown in FIGS. 3 and 4. The selected distance enhances sodium wicking by capillary forces, and provides optimized and/or uniform distribution of sodium over the surface areas of the first circumferential surface 28 of the separator 26. In some embodiments, the gap 55 may be in a range of from about 1 micrometer to about 1 millimeter and, in certain embodiments, from about 100 micrometers to about 500 micrometers. Furthermore, the gap 55 may have a uniform or non-uniform thickness, as described in the referenced Publication No. U.S. 2010/0178546 A1.

Figure 5C:
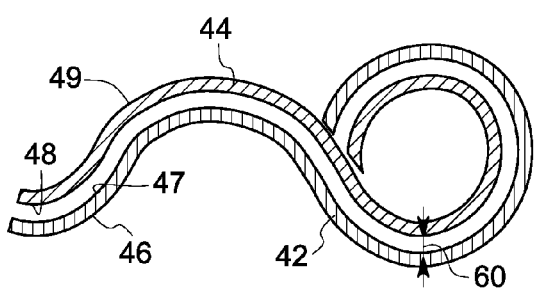
FIG. 5C is an expanded view of a cross-sectional profile of a shim structure, according to another embodiment of the invention.

The coil portion 53 may be configured with a selected number of windings. In one embodiment, the coil portion 53 may include at least a one-half winding as depicted in FIG. 3, FIG. 4 and FIG. 5B. In some cases, the coil may have about one full winding as depicted in FIG. 5C. In some embodiments, the coil may include from about one full winding to about five full windings.

Once placed in the housing 22 in this configuration, the inner circumferential surface 46 (FIG. 5A) of the first shim 42 is in contact with the first circumferential surface 28 of the separator 22, through a part of the first section 50 of the shim structure 40 (FIG. 3). At the same time, the inner circumferential surface 46 (FIG. 5A) is in contact with the interior surface 24 of the housing 22 (FIG. 4) through a portion of the second section 52 of the shim structure 40. This configuration thus provides the electrical and thermal contact between the separator and the housing through the first shim 42.

Figure 6A:
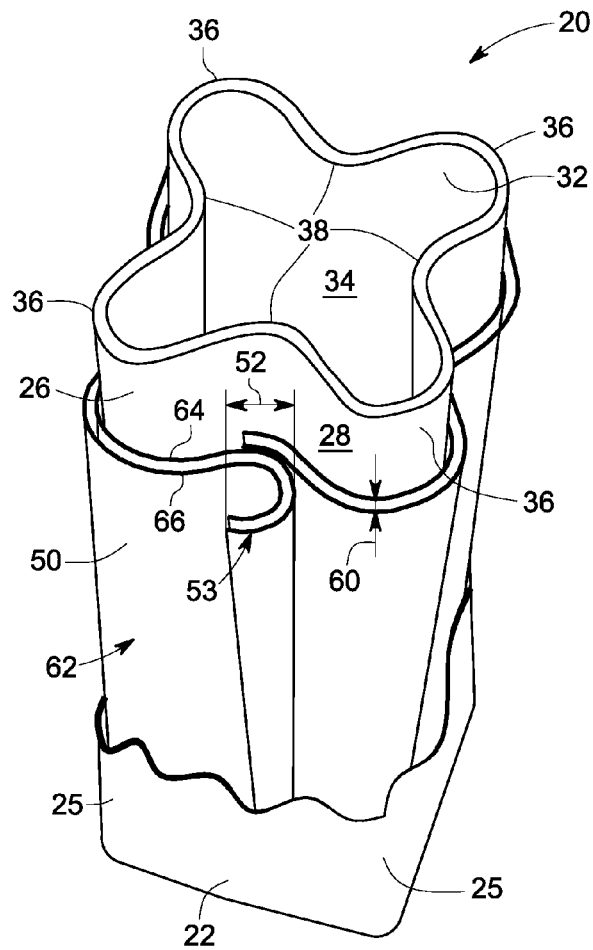
FIG. 6A is perspective, three dimensional view of an electrochemical cell, according to an embodiment of the invention.
Figure 6B:
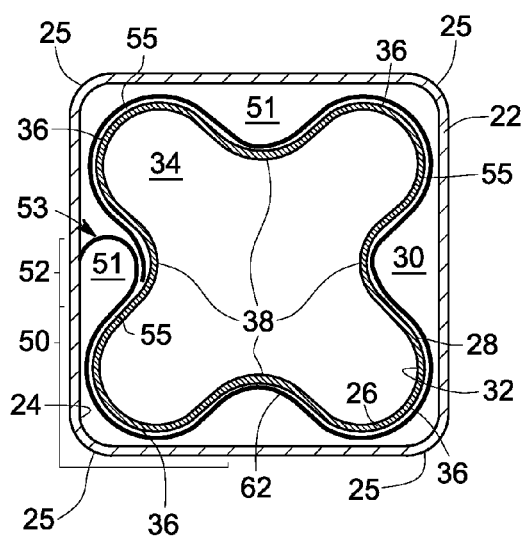
FIG. 6B is a cross-sectional, top view of an electrochemical cell, according to an embodiment of the invention.

It is also possible to place a greater number or a smaller number of the shim structures around the separator, to engage the first surface of the separator. For example, FIG. 6A and FIG. 6B illustrate an electrochemical cell 20 that includes aspects of some embodiments of the invention. The figures illustrate one circumferential section 62 of a continuous double-shim structure surrounding the separator 26 within the housing 22. The shim structure 62 includes a first shim 64 and a second shim 66. The shim structure 62 is disposed in close proximity to the first surface 28 of the separator 26, and is designed so as to wrap the circumferential section around the four lobe portions 36, and the four valley portions 38, of the separator 26. The structure 40 has a first section 50 and a second section 52. The second section 52 is in the form of a coil 53 that is placed (or inserted) in a valley portion 38 of the separator 26. The coil 53 is configured to span a gap 51 between an interior surface 24 of the housing 22, and the first surface 28 of the separator 26.

Figure 7:
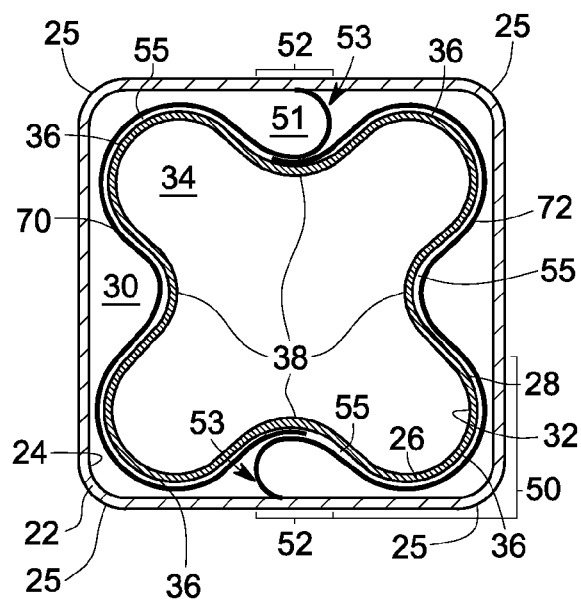
FIG. 7 is a cross-sectional, top view of an electrochemical cell, in an additional embodiment of the invention.
Figure 8:
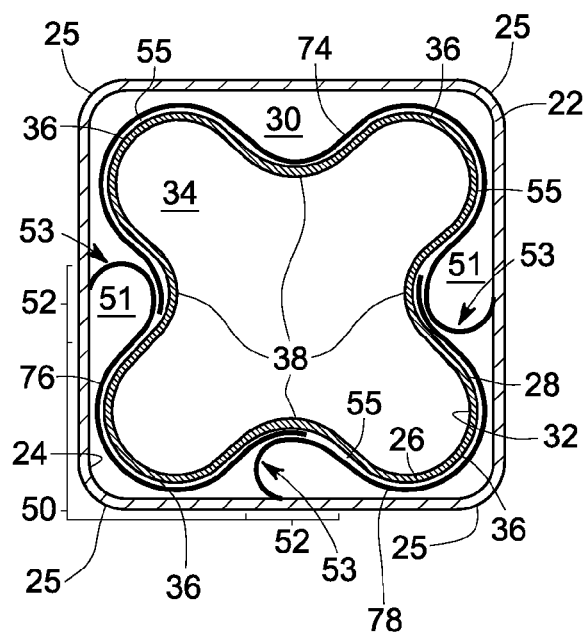
FIG. 8 is a cross-sectional top view of an electrochemical cell, in an additional embodiment of the invention.

FIG. 7 illustrates a portion of an electrochemical cell, including two circumferential sections 70 and 72, of double-shim structures. Similarly, FIG. 8 illustrates a portion of an electrochemical cell, including three circumferential sections 74, 76 and 78, of double-shim structures.

In the drawings, gaps are sometimes shown between the various parts of the shim structure, and between the overlapping parts of adjacent shim structures, for the purposes of simplifying the illustration. In practice, the shim structures may not have any gaps therebetween, so that sufficient electrical and/or ionic contact can be maintained, e.g., for wicking purposes, and for electrical and thermal communication. (In some other, significant embodiments, gaps, e.g., between shims, are in fact present, as described in detail above).

In accordance with an embodiment of the invention, an energy storage device includes a plurality of the electrochemical cells that are, directly or indirectly, in thermal and/or electrical communication with each other. Those of ordinary skill in the art are familiar with the general principles of such devices.

EXAMPLES

The example that follows is merely illustrative, and should not be construed to be any sort of limitation on the scope of the claimed invention.

Example 1

4 single-shim structures were manufactured from 4.8 cm×19.8 cm×0.1 mm steel sheets. The steel sheets were coated with nickel on both sides. The thickness of the coating was about 2 microns. The sheets were designed in a particular shape (as described in some of the above exemplary embodiments, and shown in FIG. 3), by stamping.

Example 2

8 shims of the same shape and size were formed, as described in example 1. Four double-shim structures were constructed by sliding two shims together, so that the two shims were in parallel contact with each other, fully overlapping each other.

Example 3

2 sodium-nickel-chloride cells; cell 1 and cell 2, were used for measuring the temperature profile within the cells, using single-shim structures (example 1) and double-shim structures (example 2), respectively. The cells used a beta"-alumina separator, and had same design as described for FIGS. 3 and 4. Four single-shim structures of example 1; and four double-shim structures of example 2, were assembled in close proximity to the separator within the cell 1 and cell 2, respectively. The shims were wrapped around the separator by arranging a single-shim structure or a double-shim structure, per lobe of the separator. Temperature profiles of the cells were measured using multiple thermocouples. FIG. 9 shows temperature profiles for cell 1 and cell 2. It is clear from the graph that the temperature pattern of cell 2 is lower than that of cell 1, demonstrating improved thermal management.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. An electrochemical cell, comprising:
a housing having an interior surface defining a volume,
an elongated, ion-conducting separator disposed in the volume, wherein the separator has a first circumferential surface; and
a shim structure disposed between the interior surface of the housing and the first circumferential surface of the separator, wherein the shim structure is generally parallel to the first circumferential surface of the separator, and comprises at least a first shim and a second shim that fully overlap each other.

2. The electrochemical cell of claim 1, wherein the separator has a cross-sectional profile that is a circle, an oval or ellipse, a polygon, a cross-shape, a star-shape, or a cloverleaf shape.

3. The electrochemical cell of claim 1, wherein the separator has a cross-sectional profile that comprises a plurality of lobe portions and a plurality of valley portions.

4. The electrochemical cell of claim 1, wherein the first circumferential surface of the separator defines a first compartment, and a second circumferential surface of the separator defines a second compartment that is in ionic communication with the first compartment through the separator.

5. The electrochemical cell of claim 4, wherein the second compartment is disposed within the first compartment.

6. The electrochemical cell of claim 1, wherein the shim structure is shaped to substantially conform to the first circumferential surface of the separator.

7. The electrochemical cell of claim 1, comprising a plurality of shim structures generally surrounding the separator, and corresponding in number to a plurality of lobe portions of the separator.

8. The electrochemical cell of claim 1, wherein the separator has a height dimension generally perpendicular to a base of the housing, and the shim structure extends to the full height of the separator.

9. The electrochemical cell of claim 1, wherein the shim structure comprises a double-shim structure.

10. The electrochemical cell of claim 1, wherein at least the first shim and the second shim are substantially identical in shape and size.

11. The electrochemical cell of claim 1, wherein at least the first shim and the second shim comprises an electrically conductive material.

12. The electrochemical cell of claim 11, wherein the electrically conductive material comprises iron, nickel, copper, aluminum or an alloy thereof.

13. The electrochemical cell of claim 1, wherein the first shim and the second shim comprise different materials.

14. The electrochemical cell of claim 13, wherein the first shim comprises a sodium-philic material.

15. The electrochemical cell of claim 14, wherein the second shim comprises copper.

16. The electrochemical cell of claim 1, wherein the shim structure defines a gap between the first shim and the second shim.

17. The electrochemical cell of claim 16, wherein the gap is sufficient in size to accommodate an amount of an anodic material.

18. The electrochemical cell of claim 1, further comprising a core region that produces heat during operation of the electrochemical cell; wherein the first shim and the second shim overlap each other in a configuration that is capable of dissipating excess heat away from the core region of the electrochemical cell.

19. An electrochemical cell, comprising:
a housing having an interior surface defining a volume, and having a base;
wherein the housing is polygonal in cross-section, and has a plurality of corner regions;
an ion-conducting separator disposed in the volume, and extending in a generally vertical direction relative to the base of the housing, so as to define a height dimension of the cell, and having a first circumferential surface defining a portion of a first compartment, wherein the separator comprises a plurality of lobe portions that correspond in number to the plurality of the corner regions of the housing, and the separator is concentrically located in the housing, with each of the plurality of lobe portions of the separator being aligned with and projecting towards one of the corner region of the housing; and
a plurality of double-shim structures generally surrounding the separator and corresponding in number to the plurality of lobe portions, wherein the plurality of double-shim structures is disposed between the interior surface of the housing and the first circumferential surface of the separator, and positioned generally parallel to the first circumferential surface of the separator, and wherein each double-shim structure of the plurality of double-shim structures has a first shim and a second shim that are symmetrical, and fully overlap each other.

20. An energy storage device comprising a plurality of the electrochemical cells of claim 19, wherein the plurality of electrochemical cells are in thermal and electrical communication with each other.

* * * * *